United States Patent
Kim

(10) Patent No.: US 9,491,132 B2
(45) Date of Patent: Nov. 8, 2016

(54) SYSTEM AND METHOD FOR PROVIDING PUSH SERVICE FOR REDUCING NETWORK LOADS

(71) Applicant: SK TELECOM CO., LTD., Seoul (KR)

(72) Inventor: Jin Goog Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 294 days.

(21) Appl. No.: 14/052,029

(22) Filed: Oct. 11, 2013

(65) Prior Publication Data

US 2014/0040380 A1   Feb. 6, 2014

Related U.S. Application Data

(63) Continuation of application No. PCT/KR2012/003793, filed on May 15, 2012.

(30) Foreign Application Priority Data

May 16, 2011  (KR) .................... 10-2011-0045902

(51) Int. Cl.
  *G06F 15/16*  (2006.01)
  *H04L 12/58*  (2006.01)
  *H04L 29/08*  (2006.01)
  *H04L 12/24*  (2006.01)

(52) U.S. Cl.
  CPC .......... *H04L 51/24* (2013.01); *H04L 41/0668* (2013.01); *H04L 67/26* (2013.01)

(58) Field of Classification Search
  USPC ....................................................... 709/227
  See application file for complete search history.

(56) References Cited

U.S. PATENT DOCUMENTS

| 7,355,975 | B2* | 4/2008 | Liu ................... H04L 12/1868 370/235 |
| 7,693,953 | B2* | 4/2010 | Middleton ............. G06Q 30/02 370/338 |
| 7,715,868 | B2* | 5/2010 | Zhao ................... H04W 76/027 370/329 |
| 7,818,025 | B2* | 10/2010 | Zhao ................... H04W 76/027 370/329 |
| 8,055,711 | B2* | 11/2011 | Fachan ............. G06F 17/30227 709/205 |

(Continued)

FOREIGN PATENT DOCUMENTS

| KR | 1020070099555 A | 10/2007 |
| KR | 100788245 B1 | 12/2007 |
| WO | WO 2008048075 A1 * | 4/2008 ......... H04L 12/1859 |

OTHER PUBLICATIONS

Korean Office Action for application No. 10-2011-0045902 dated Aug. 31, 2012, citing the above reference(s).

*Primary Examiner* — Alicia Baturay
(74) *Attorney, Agent, or Firm* — Hauptman Ham, LLP

(57) ABSTRACT

Disclosed are a system for providing a push service including: a client device to receive a push message provided by a service providing device and provide a push service; and a push service device configured to transmit the push message provided by the service providing device to the client device, wherein at least one of the client device and the push service device is configured to attempt a reconnection mutually according to a predetermined reference, when a connection between the client device and the push service device is terminated.

12 Claims, 7 Drawing Sheets

(56) References Cited

U.S. PATENT DOCUMENTS

| | | | | |
|---|---|---|---|---|
| 8,099,764 B2* | 1/2012 | Herzog | ............... | H04L 12/5895 380/229 |
| 8,121,637 B2* | 2/2012 | Zhao | ................... | H04W 76/027 455/414.1 |
| 8,428,565 B2* | 4/2013 | Middleton | ............. | G06Q 30/02 455/414.1 |
| 8,548,433 B1* | 10/2013 | Othmer | ................... | H04W 4/00 379/67.1 |
| 2001/0056503 A1* | 12/2001 | Hibbard | .............. | G06F 11/2012 709/250 |
| 2004/0219925 A1* | 11/2004 | Ahya | ................... | H04W 72/044 455/450 |
| 2005/0223014 A1* | 10/2005 | Sharma | ............. | G06F 17/30197 |
| 2010/0013918 A1* | 1/2010 | Ta'Eed | ............ | H04N 1/00106 348/143 |

* cited by examiner

SYSTEM AND METHOD FOR PROVIDING PUSH SERVICE FOR REDUCING NETWORK LOADS

CROSS-REFERENCE TO RELATED APPLICATION

The present application is a continuation of International Application No. PCT/KR2012/003793 filed on May 15, 2012, which is based on, and claims priority from, KR Application Serial Number 10-2011-0045902, filed on May 16, 2011. The disclosures of the above-listed applications are hereby incorporated by reference herein in their entirety.

FIELD

The present disclosure relates to a system and a method for providing a push service which allows at least one of a push service device or a client device to selectively attempt a reconnection when a connection between the push service device and the client device is disconnected.

BACKGROUND

The statements in this section merely provide background information related to the present disclosure and do not constitute prior art.

As smart phones have been distributed and various applications have appeared due to a smart phone environment, the use of radio resources has significantly increased. Particularly, always-on applications which are always being accessed to receive a real time push message or push notification from a network, such as an Instant Message (IM) service, a web service, and a widget service currently increase at a high speed. The inventor(s) has experienced that the always-on applications are always ready to receive the push service while maintaining a connection with a service provider, so that excessive traffic is generated and battery consumption is accelerated.

The inventor(s) has noted that when a service provider maintains a connection with a push server through a daemon configured within a client device without a direct connection between the service provider and the client device and transmits a push message or a push notification, the push server in the center receives the push message or push notification and transmits the push message or push notification to the corresponding client device.

FIG. 1 is a diagram of a configuration of a known push service providing system.

Referring to FIG. 1, since gateways 20 and carriers 30 are located between a plurality of service providers 10 and a plurality of terminals 40, the applications installed within the plurality of terminals 40 are connected with the carriers 30 and the gateways 20 and thus connected with the service providers 10 without the need to individually connect to the service provider 10.

The gateways 20 are relay devices for performing connections with the plurality of service providers 10 and the carriers 30 are devices for performing connections with the plurality of terminals (or terminal devices) 40. The gateways 20 and the carriers 30 have an expandable structure according to increases in the service providers 10 and the terminals 40.

However, the inventor(s) has noted that according to FIG. 1, the terminals 40 are managed based on zones, so that the terminals 40 are allocated to the carriers 30 determined according to preset information when the terminals 40 are interworked with the carriers 30. Such a method has a fast processing speed. However, when the terminals 40 within the same zone rapidly increase, the inventor(s) has experienced that the terminals 40 which are accommodated by one carrier 30 are all supported by the one carrier 30, so that the carrier 30 easily becomes overloaded.

Particularly, when a connection with the terminal 40 is abnormally terminated due to an error of the carrier 30, the connection between the carrier 30 and the terminal 40 is re-attempted. Since the attempt of the connection is simultaneously made by the carrier 30 and the terminal 40, the inventor(s) has experienced that momentary network loads are generated as the number of carriers 30 or terminals 40 increases.

Accordingly, when the client devices (or terminal devices) using a push service and the service providers increase, the inventor(s) has noted that a method of effectively dispersing the loads of the server is an important issue. Therefore, the method of dispersing the loads generated when the service provider and the terminal are connected with the push server is required.

SUMMARY

In accordance with another aspect of the present disclosure, a push service device comprises a service provider (SP) interworking unit, a client interworking unit and a controller. The service provider (SP) interworking unit is configured to be connected with a service providing device and to receive a push message from the service providing device. The client interworking unit is configured to be connected with a client device to transmit the received push message to the client device. And the controller is configured to attempt a reconnection with the client device through the client interworking unit when another push message to be transmitted to the client device is received from the SP interworking unit or a keep-alive message is received from the client device in a state where a connection between the client interworking unit and the client device is terminated between the client interworking unit and the client device is terminated.

DETAILED DESCRIPTION

Figure 1:
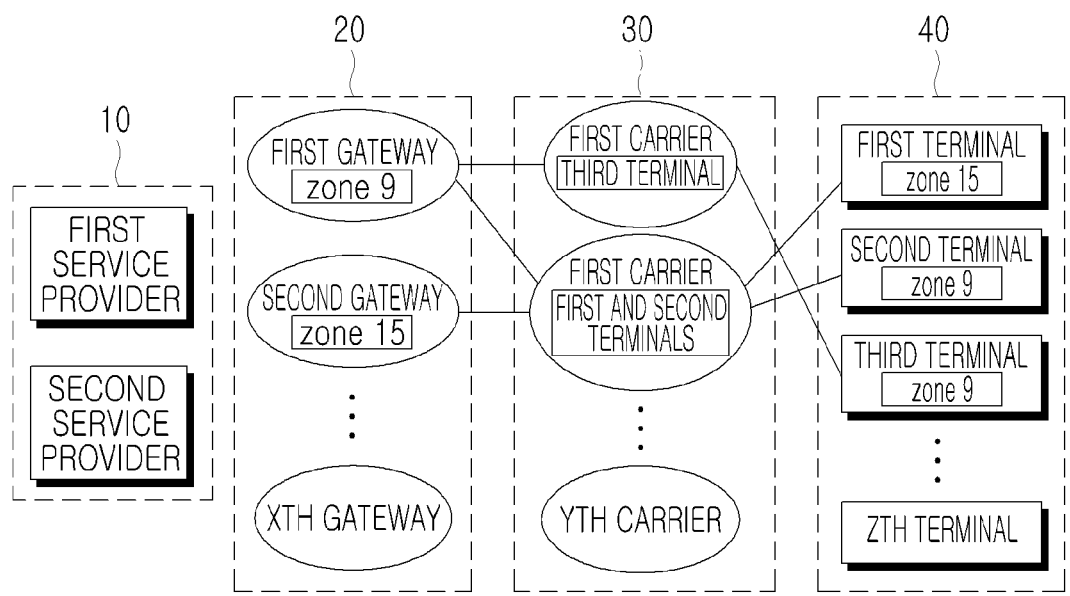
FIG. 1 is a diagram of a configuration of a known push service providing system.

Hereinafter, embodiments of the present disclosure will be described with reference to the accompanying drawings.

A configuration of the present disclosure and the corresponding effect will be clearly understood through the following detailed description. Prior to the detailed description, the same elements will be designated by the same reference numerals although they are shown in different drawings, and a detailed description of known functions and configurations incorporated herein will be omitted when it makes the subject matter of the present disclosure rather unclear.

The present disclosure provides a system and a method for providing a push service in which, when a connection with a client device is disconnected due to an error of a push service device performing the connection with the client device (or terminal device), the push service device or the client device selectively attempts a reconnection so as to reduce network loads due to the attempt of the reconnection between the push service device and the client device. Particularly, the present disclosure discloses dispersing network loads generated due to an abnormal disconnection between the push server and the client device The present disclosure discloses at least two embodiments in which, when a connection between a push service device and a client device is abnormally terminated, e.g., due to an error of the push service device, a reconnection with the client device is not directly or immediately performed, but a reconnection between the push service device and the client device is selectively attempted using an auxiliary device of the push service device.

Figure 2:
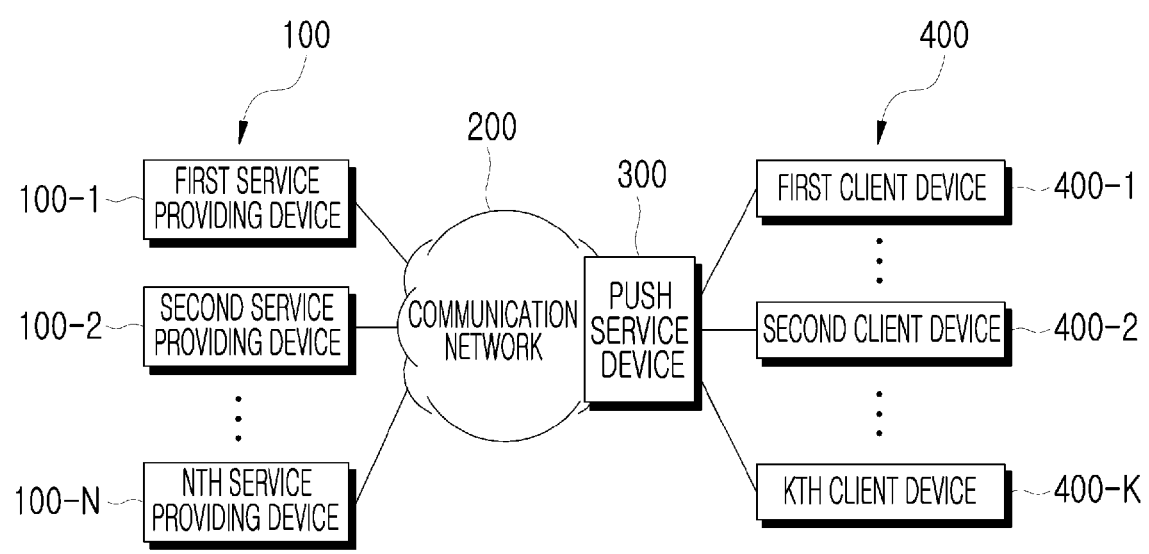
FIG. 2 is a diagram of a network configuration of a push service providing system according to at least one embodiment of the present disclosure.

FIG. 2 is a diagram of a network configuration of a push service providing system according to at least one embodiment of the present disclosure.

As shown in FIG. 2, the push service providing system 100 according to at least one embodiment of the present disclosure is configured to include a plurality of service providing devices 100-1 to 100-N (100), a push service device 300, and a plurality of client devices 400-1 to 400-K (400), and is configured to have a structure in which the service providing devices 100 and the client devices 400 are connected with each other through the central a push service device 300 in the center.

The client devices 400 are terminals capable of connecting with a communication network 200, and for example, is configured to include a personal computer, a notebook computer, a smart phone, a Personal Digital Assistant (PDA), a tablet PC, a navigation, a Portable Multimedia Player (PMP), an electronic dictionary, and or an MP3 player. The client devices 400 are loaded with client application programs configured to transmit and receive data (especially, push messages, push notifications or the like) through connections with the communication network 200.

The plurality of service providing devices 100 refers to servers or terminals that transmit a push message to the plurality of client devices 400 to provide a service.

Basically, the push service device 300 gathers push messages transmitted from the plurality of service providing devices 100 and transmits the gathered push messages to the corresponding client device 400.

At this time, the push service device 300 is configured to manage interconnections between the service providing devices 100 and the client device 400, and disperses unequal distribution of the plurality of service providing devices 100 and the plurality of client devices 400 according to internal loads. Further, the push service device 300 processes such that the push message transmitted from the service providing device 100 is provided to the corresponding client device 400.

The push service device 300 is implemented independently for each function, that is, a function of interworking between the service providing device 100 and the client device 400, a function of dispersing loads in interworking, and a function of processing a push message are separately implemented by independent devices. Accordingly, when the service providing devices 100 and/or the client devices 400 increase, the push service devices 300 also can be individually expanded for each function.

Figure 3:
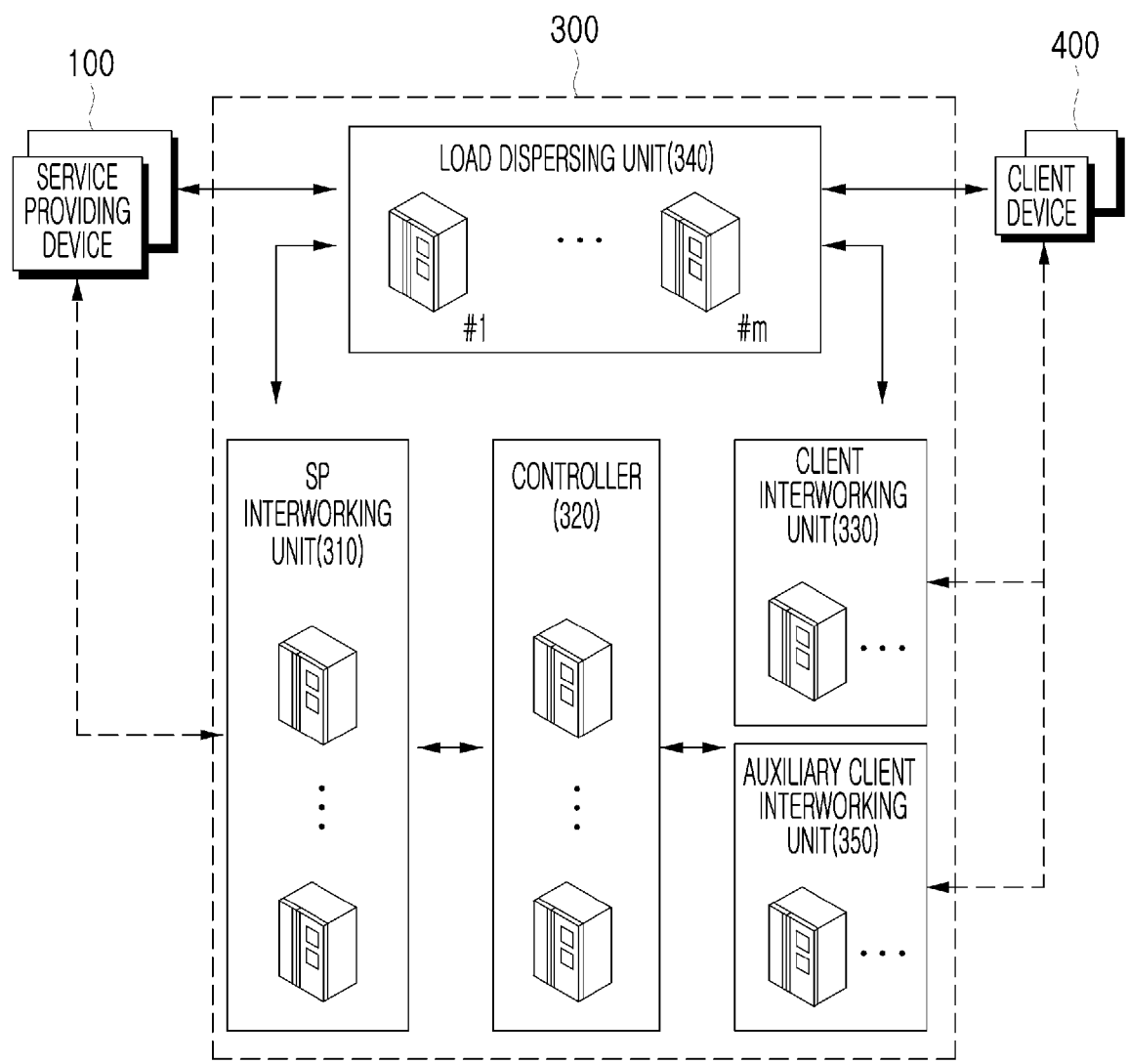
FIG. 3 is a diagram of a detailed configuration of a push service device according to at least one embodiment of the present disclosure.

FIG. 3 is a diagram illustrating a detailed configuration of the push service device according to at least one embodiment of the present disclosure.

The push service device 300 according to the present disclosure includes a service provider (SP) interworking unit 310, a controller 320, a client interworking unit 330, a load dispersing unit 340, and an auxiliary client interworking unit 350. Other components of the push service device 300, such as the SP interworking unit 310, the controller 320, the client interworking unit 330, the load dispersing unit 340 and the auxiliary client interworking unit 350 are implemented by one or more processors and/or application-specific integrated circuits (ASICs). All the components in FIG. 3 are plural ones. It is assumed for description convenience that a component (e.g., SP interworking unit 310) described as a single indicates each of the corresponding plurality of components (e.g., SP interworking units 310). This assumption further applies to other components in FIGS. 4-6 for description convenience.

The SP interworking unit 310 is configured to be connected with the plurality of service providing devices 100 to receive a push message to be transmitted to the client device 400 from the plurality of service providing devices 100. Here, the push message includes new information, updated information, event information or the like.

The client interworking unit 330 is configured to be connected with the plurality of client devices 400 to transmit the push message received from the SP interworking unit 310 to the plurality of client devices 400.

The auxiliary client interworking unit 350 which corresponds to an auxiliary device of the client interworking unit 330 is configured to back up setting information of the client interworking unit 330 when the client interworking unit 330 has an error and directly performs a function of the client interworking unit 330 having the error. The setting information of the client interworking unit 330 includes mapping information between the client device and the controller 320, information on processing a connection request from the client device, information on routing a push message received by the controller 320 to a corresponding client device and the like.

At this time, numbers of the SP interworking units 310 and the client interworking units 330 are plural according to the number of connections of the service providing devices 100 or the client devices 400 which are connected with each of the interworking units 310 and 330. In general, since the number of terminals acceptable by each of the interworking units 310 and 330 is predetermined, the interworking units 310 and 330 are increased based on the number of acceptable terminals.

Further, each of the SP interworking unit 310 and the client interworking unit 330 provides its own state information to the load dispersing unit 340 on every predetermined period. The state information includes the number of subscribers (or referred to as the number of connections) connected with the SP interworking unit 310 and the client interworking unit 330, Transaction Per Seconds (TPS) and the like.

Then, the load dispersing unit 340 receives its own state information from the SP interworking unit 310 or the client interworking unit 330, calculates load information on each of the SP interworking unit 310 and the client interworking unit 330, makes the calculated load information in a table form, and stores the table.

Further, when there is a connection request from the plurality of service providing devices 100 or the plurality of client devices 400, the load dispersing unit 340 allocates respective connectable interworking units to the service providing devices or the client devices with reference to the pre-stored load information of the interworking units. Accordingly, the load dispersing unit 340 serves to disperse loads of each of the interworking units 310 and 330.

The controller 320 manages the plurality of SP interworking units 310 and client interworking units 330, and particularly manages routing information on the connectable client interworking units 330 for each client device. Here, the connectable client interworking unit 330 for each client device refers to the client interworking unit of which a connection state is maintained by the client device and includes the client interworking unit allocated through the load dispersing unit 340.

Accordingly, when the controller 320 receives the push message from the SP interworking unit 310, the controller 320 extracts the client interworking unit 330 with which the corresponding client device can be connected through client information included in the push message, and transmits the push message to the extracted client interworking unit 330.

Figure 4:
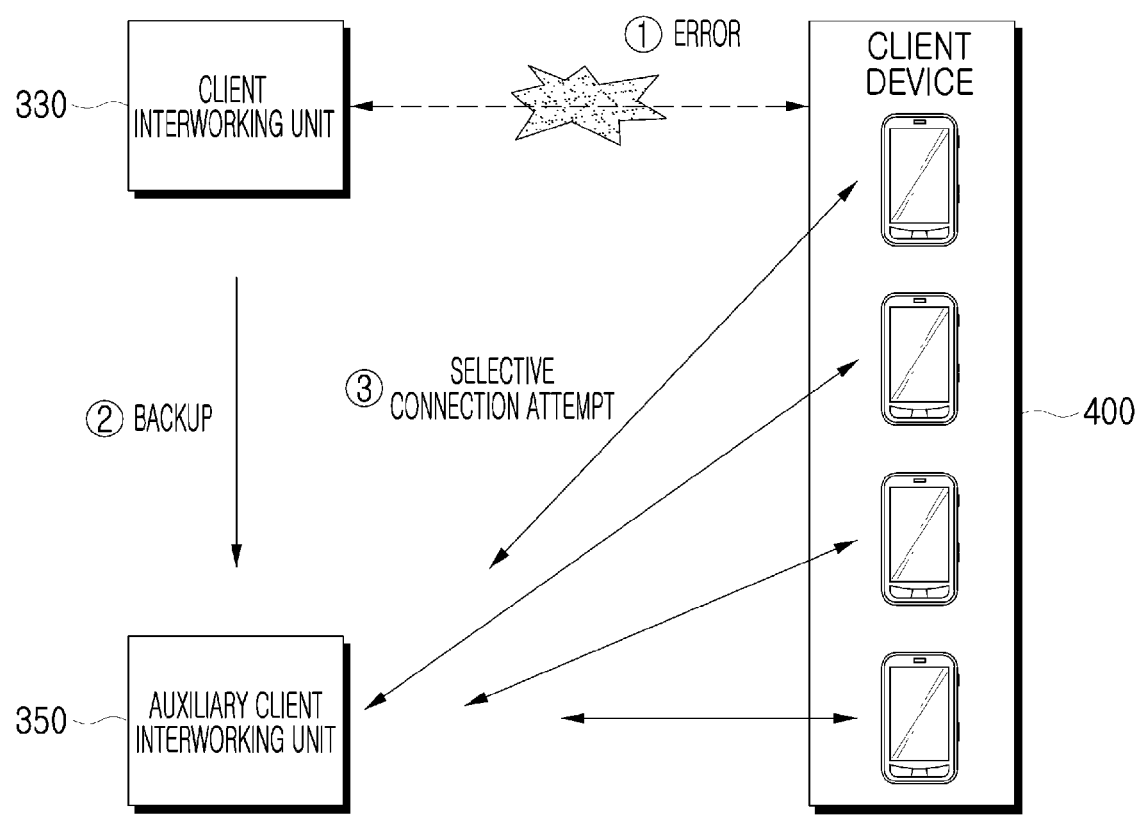
FIG. 4 is a diagram of a connection setting configuration between a push service device and a client device according to at least one embodiment of the present disclosure.

At this time, when an error is generated in the client interworking unit 330 as shown in FIG. 4, the connection between the client interworking unit 330 and the client device 400 is abnormally terminated and thus the client interworking unit 330 cannot transmit the push message in ①.

In this case, the controller 320 backs up the setting information of the client interworking unit 330 to the auxiliary client interworking unit 350 in ②, and the auxiliary client interworking unit 350 is selectively reconnected with the client device 400 based on the backed up setting information and transmits the push message in ③. At this time, the selective reconnection between the auxiliary client interworking unit 350 and the client device 400 is made by the auxiliary client interworking unit 350 or the client device 400.

For example, when the connection between the client interworking unit 330 and the client device 400 is abnormally terminated and then the push service device receives the push message to be transmitted to the client device, the auxiliary client interworking unit 350 attempts to be reconnected to the client device 400 in order to transmit the received push message. Such a method is one example method of making the reconnection attempt by the auxiliary client interworking unit 350.

Another example method uses a keep-alive time when the reconnection attempt is made by the client device. That is, when the connection between the client interworking unit 330 and the client device 400 is abnormally terminated and then the keep-alive time arrives, the client device 400 transmits a keep-alive message to the auxiliary client interworking unit 350 to attempt the reconnection between the auxiliary client interworking unit 350 and the client device 400.

The keep-alive message refers to a transmitted/received message to inform of an active state between two or more devices. According to the present disclosure, by exchanging the keep-alive message between the client interworking unit 330 or the auxiliary client interworking unit 350 of the push service device and the client device 400, a mutual connection state can be identified. The keep-alive message is periodically transmitted in every preset keep-alive time such as 60 seconds, 30 minutes, 60 minutes or the like.

Hereinafter, a push service providing method which can prevent overloading of a network through a connection between the push service device and the client device by using the above two methods will be described in detail.

Figure 5:
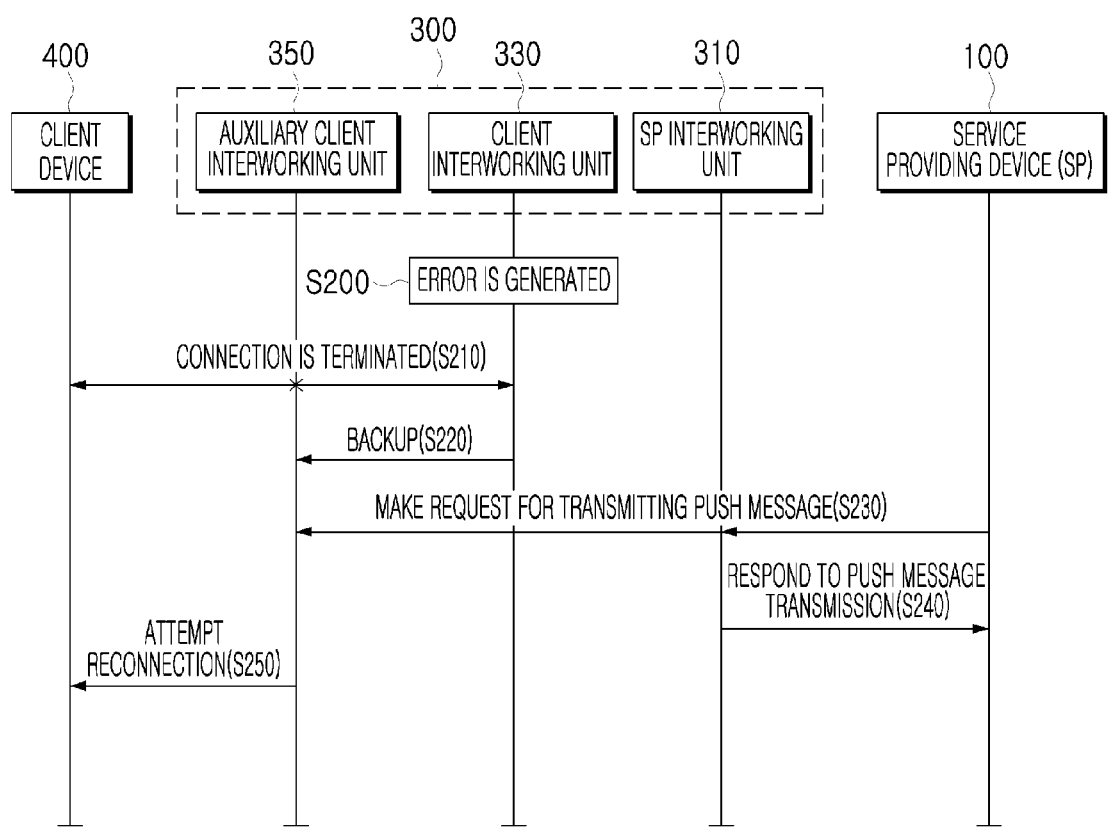
FIG. 5 is a flowchart of a push service providing method for reducing network loads according to at least one embodiment of the present disclosure.
Figure 6:
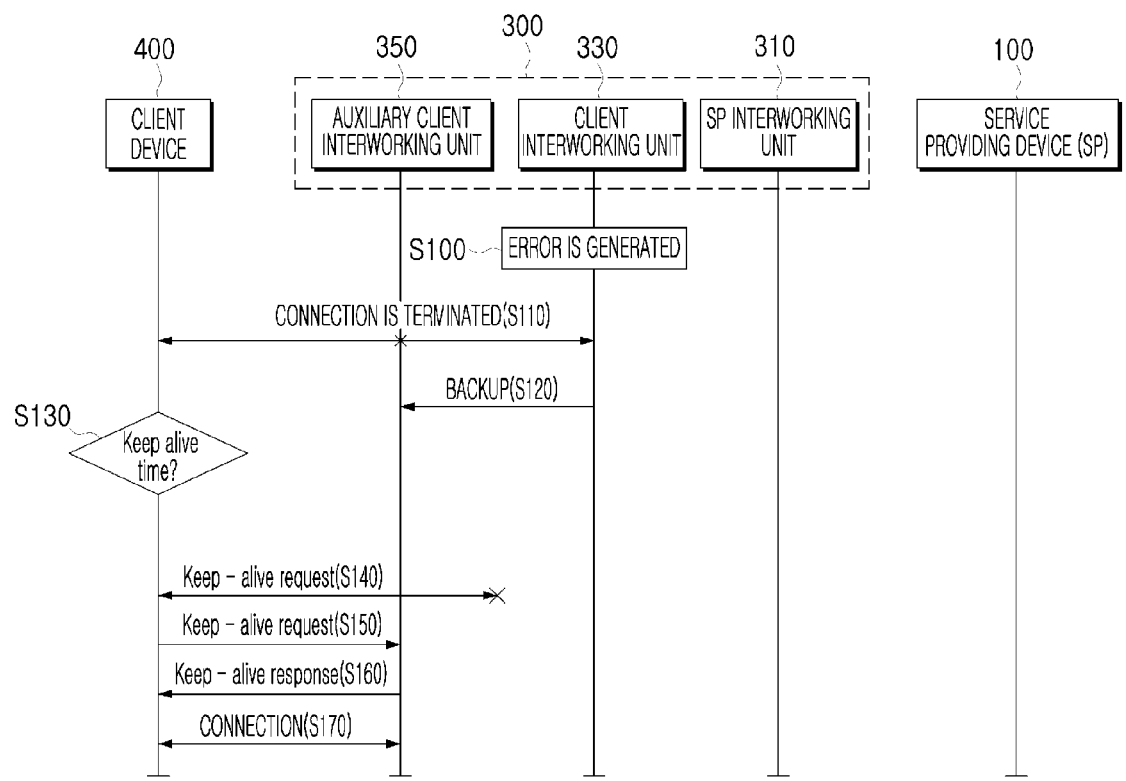
FIG. 6 is a flowchart of a push service providing method for reducing network loads according to at least another embodiment of the present disclosure.

FIG. 5 is a flowchart illustrating a push service providing method for reducing network loads according to at least one embodiment of the present disclosure, and FIG. 6 is a flowchart illustrating a push service providing method for reducing network loads according to at least another embodiment of the present disclosure.

First, a push service providing method through an attempt of a reconnection between the push service device and the client device will be described with reference to FIG. 5.

When an error is generated in the client interworking unit 330 within the push service device 300 in step S200, a connection between the client interworking unit 330 and the client device 400 is abnormally terminated in step S210.

The client interworking unit 330 copies setting information of the client interworking unit 330 and backs up the copied setting information to the auxiliary client interworking unit 350 additionally configured in the push service device 300 according to a control of the controller (320 of FIG. 3). From this point, the auxiliary client interworking unit 350 equally performs the function of the client interworking unit 330 instead of the client interworking unit 330.

Thereafter, when the SP interworking unit 310 of the push service device 300 receives a push message transmission request from the service providing device 100 in a state where the connection between the push service device 300 and the client device 400 is terminated, the SP interworking unit 310 transmits the push message transmission request to the auxiliary client interworking unit 350 through the controller (320 of FIG. 3) in step S230 and transmits a response message responsive to push message transmission to the corresponding service providing device 100 in step S240.

Then, the auxiliary client interworking unit 350 of the push service device 300 attempts the reconnection with the client device 400 by transmitting a text message for a reconnection to the client device 400 to which the push message will be transmitted in step S250. The text message for the reconnection is transmitted in a short message type or another specific message format and provides a detour route for reinitiating the connection with the client device 400.

Accordingly, when the connection between the push service device 300 and the client device is terminated and then there is a push message to be transmitted to the client device, the auxiliary client interworking unit 350 recognizes that the connection with the corresponding client device is disconnected and attempts a reconnection with the corresponding client device. As a result, it is possible to prevent momentary network overloading generated due to the immediate attempt of the reconnection when the connection is terminated.

Next, referring to FIG. 6, when an error is generated in the client interworking unit 330 of the push service device 300 in S100 like in FIG. 5, a connection between the client interworking unit 330 and the client device 400 is abnormally terminated in step S110.

The client interworking unit 330 copies setting information of the client interworking unit 330 and backs up the copied setting information to the auxiliary client interworking unit 350 additionally configured in the push service device 300 according to a control of the controller (320 of FIG. 3) in step S120. From this point, the auxiliary client interworking unit 350 equally performs the function of the client interworking unit 330 instead of the client interworking unit 330.

Thereafter, the client device 400 checks whether a keep-alive time arrives in step S130. When the keep-alive time arrives, the client device 400 makes a request for a keep-alive message to the client interworking unit 330, but cannot receive a response to the request for the keep-alive message since the client device 400 cannot directly recognize that the connection with the client interworking unit 330 is disconnected in step S140.

When the client device 400 does not receive the response to the request for the keep-alive message from the client interworking unit 330, the client device 400 recognizes that the connection with the client interworking unit 330 is disconnected. Then, the client device 400 transmits a register message to the auxiliary client interworking unit 350 to establish a session and then makes a request for the keep-alive message to the auxiliary client interworking unit 350 in step S150.

Thereafter, the client device 400 receives the response to the request for the keep-alive message from the auxiliary client interworking unit 350 in step S160 and is connected with the auxiliary client interworking unit 350 through such a process in step S170.

Figure 7:
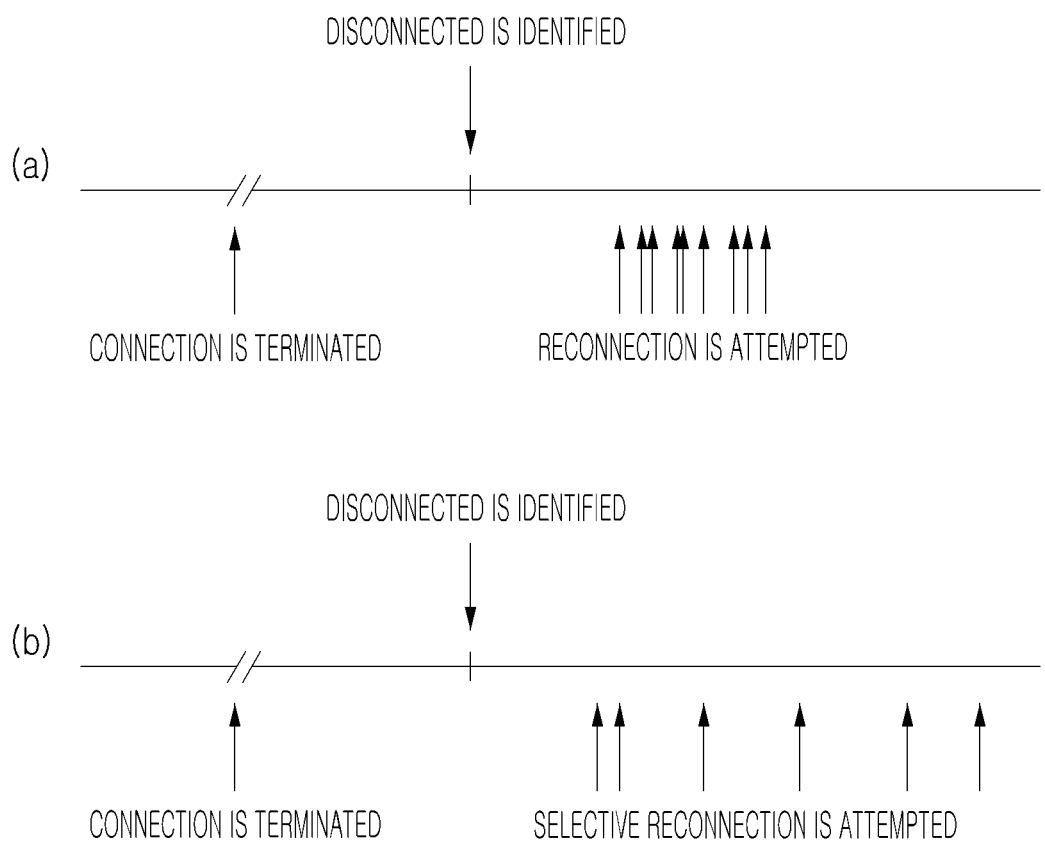
FIG. 7 is a diagram describing an effect according to at least one embodiment the present disclosure.

As described above, according to the present disclosure through FIGS. 5 and 6, when the connection between the push service device and the client device is abnormally terminated and the push service device or the client device identifies that the connection is disconnected, the push service device or the client device selectively attempts a reconnection according to whether there is a push message or whether a keep-alive time arrives as shown in FIG. 7(b).

For example, when the push service device receives the push message earlier than the keep-alive time after identifying the disconnection, the push service device attempts the reconnection with the client device regardless of the keep-alive time. In contrast, when the keep-alive time arrives after the identification of the disconnection, the client device first attempts the reconnection regardless of reception of the push message.

Accordingly, it is possible to prevent momentary network overloading generated as the reconnection between the client device and the push service device is immediately attempted after the connection is terminated as shown in FIG. 7(a).

When a connection with a client device is disconnected due to an error of a push service device performing the connection with the client device, the push service device or the client device selectively attempts a reconnection. As a result, there is an effect of reducing network loads due to the attempt of the reconnection between the push service device and the client device. A known push service providing system generates excessive loads since terminal devices which are accommodated by a push service increase as numbers of connections of service providers and client devices increase, but the present disclosure has an effect of reducing network loads by selectively attempting a reconnection as necessary without an immediate connection after a connection with a client device is disconnected due to an error of a push service device when a push message received from a service providing device is provided to the client device through the push service device.

Some embodiments as described above are implemented in the form of one or more program commands that can be read and executed by a variety of computer systems and be recorded in any non-transitory, computer-readable recording medium. The computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

The above description merely corresponds to an example and is variously modified without departing from the scope of the claimed invention by those skilled in the art. Accordingly, the embodiments disclosed in the specification of the present disclosure do not limit the present disclosure. The scope of the claimed invention is construed by the appended claims and all technologies within the range equivalent to the claims are construed as being included in the scope of claimed invention. Specific terms used in this disclosure and drawings are used for illustrative purposes and not to be considered as limitations of the present disclosure.

The invention claimed is:

1. A push service device, comprising:
   a service provider (SP) interworking unit configured to receive a push message from a service providing device;
   a first client interworking unit configured to transmit the received push message to a client device;
   a second client interworking unit; and
   a controller comprising a processor, the processor configured to
      hold, when the first client interworking unit failed to transmit the received push message to the client device, a transmission of the received push message,
      perform, when another push message to be transmitted to the client device is received through the SP interworking unit or when a keep-alive message is received from the client device through the first client interworking unit, a reconnection with the client device through the first client interworking unit, and
      transmit, to the client device, the held push message through the first client interworking unit,
   wherein, when a failure of the transmission is caused by the first client interworking unit,
      the processor is configured to back up the received push message and the setting information of the first client interworking unit in the second client interworking unit, and the second client interworking unit is configured to
store the backed-up push message and the backed-up setting information,
perform a reconnection with the client device based on the backed-up setting information, and
transmit, when the second client interworking unit is connected to the client device, the backed-up push message to the client device.

2. The push service device of claim 1,
wherein the second client interworking unit is configured to perform, when another push message to be transmitted to the client device is received through the SP interworking unit or when a keep-alive message is received from the client device through the second client interworking unit, the reconnection with the client device based on the backed-up setting information.

3. The push service device of claim 1, further comprising:
a load dispersing unit configured to
receive state information from the SP interworking unit or the first client interworking unit,
calculate load information on each of the SP interworking unit and the first client interworking unit,
arrange the calculated load information in a table, and store the table.

4. The push service device of claim 3, wherein the state information includes at least one of a number of client devices connected with the first client interworking unit, and transaction per seconds (TPS).

5. The push service device of claim 3, wherein the load dispersing unit is configured to receive the state information from the SP interworking unit or the first client interworking unit periodically.

6. A push service device, comprising:
a service provider (SP) interworking unit configured to receive a push message from a service providing device;
a first client interworking unit configured to transmit the received push message to a client device based on setting information;
a second client interworking unit; and
a controller comprising a processor, the processor configured to
back up, when the first client interworking unit failed to transmit the received push message to the client device, the received push message and the setting information of the first client interworking unit in the second client interworking unit,
wherein the second client interworking unit is configured to
store the backed-up push message and the backed-up setting information,
perform, when another push message to be transmitted to the client device is received through the SP interworking unit or when a keep-alive message is received from the client device through the second client interworking unit, a reconnection with the client device based on the backed-up setting information, and
transmit, when the second client interworking unit is reconnected to the client device, the backed-up push message based on the backed-up setting information to the client device.

7. The push service device of claim 6, wherein the second client interworking unit is configured to receive the keep-alive message periodically according to a preset keep-alive time.

8. The push service device of claim 6, wherein the controller is configured to perform, when the keep-alive message is received from the client device through the second client interworking unit, a reconnection with the client device by transmitting a response message responding to the keep-alive message to the client device based on the backed up setting information of the first client interworking unit.

9. The push service device of claim 6, wherein the controller is configured to perform, when the another push message to be transmitted to the client device is received through the SP interworking unit, a reconnection with the client device through the second client interworking unit.

10. A method of providing a push service by a push service device comprising a processor, the method comprising:
receiving, by the push service device, a push message from a service providing device;
transmitting, by the push service device, the received push message to a client device; and
when the push service device failed to transmit the received push message to the client device, backing up, by the push service device, the failed push message and setting information of a network connection with the client device,
wherein the push service device performs, when another message to be transmitted to the client device is received or when a keep-alive message is received from the client device, a reconnection with the client device by transmitting a reconnection message to the client device based on the backed-up setting information of the network connection.

11. The method of claim 10, wherein the performing a reconnection comprises,
when the another push message to be transmitted to the client device is received from the service providing device, transmitting, by the push service device, the reconnection message to the client device based on the backed up setting information, and
performing, by the push service device, the reconnection with the client device.

12. The method of claim 10, wherein the performing a reconnection comprises,
when the keep-alive time arrives, transmitting, by the client device, the keep-alive message to the push service device having the backed up setting information, and
performing, by the client device, a reconnection with the push service device based on a response message responsive to the transmitted keep-alive message.

* * * * *